3,299,617
METHOD OF REMOVING ENTRAPPED GAS FROM
AN ION EXCHANGE RESIN BED
Edward W. Dunklin, Milwaukee, Wis., assignor, by mesne assignments, to Culligan Inc., North Brook, Ill., a corporation of Delaware
No Drawing. Filed Apr. 9, 1964, Ser. No. 358,630
4 Claims. (Cl. 55—37)

This invention relates to a method of removing entrapped gas from an ion exchange resin bed and more particularly for removal of air from an ion exchange resin bed in a water softener.

In the process of manufacturing a water softener, a quantity of an ion exchange resin is introduced into the completed tank and the tank is then pressure-tested with water. After testing, the water is blown out of the tank and the tank is sealed for shipment to the dealer or distributor. The ion exchange resin, which is generally in a moist condition during shipment, is a relatively porous material, and air is entrapped, not only within the particles of the resin, but also between the particles.

When the water softener is installed at the location of use, the tank is filled with water and a substantial portion of air passes upwardly in the tank and is compressed and remains in the upper portion of the tank during use. However, a considerable portion of air remains entrapped within the individual resin particles. In addition, some air is also entrapped between resin particles and remains within the bed due to the fact that the water flow during the softening process is downwardly against the rising flow of air bubbles.

During the regeneration of the resin bed, one of the steps in the regeneration cycle is backwashing the resin to remove trapped foreign solids, such as scale and rust. At the commencement of the backwash the pressure on the system is suddenly released and the air entrapped within the resin particles and entrapped between the resin particles, which was compressed to a fraction of its original volume, is suddenly expanded with almost explosive turbulence. This sudden expansion often blows the resin from the tank and plugs valves, outlet flow controls and thereby causes a significant reduction in the efficiency of performance, or in some cases necessitating costly disassembly of the tank to correct this malfunction.

Various methods have been tried in the past to minimize this expansion effect of the entrapped air. Among the methods are the prolonged running of water through the system in an attempt to dissolve the trapped air, the general practice of shipping the resin in a wet state to minimize the amount of air in contact with the resin, designing excessive freeboard in the tank, the use of screens and the like.

According to the invention, the problem of air entrapment in the ion exchange resin bed is eliminated by adding small amounts of a wetting agent to the resin bed. The wetting agent serves to penetrate and wet the surface of the resin particles and releases the adsorbed and entrapped air. Subsequently, when water is initially introduced into the tank, the released air will escape in the form of very small bubbles which will not disturb the bed on escaping. As the air is released by use of the wetting agent, there will be no explosive expansion of entrapped air within the resin bed during the regeneration cycle so that the resin bed will be undisturbed and this will eliminate the problem of plugging of valves, outlet flow controls and other elements of the system.

The addition of the wetting agent to the ion exchange resin bed also significantly increases the ion exchange capacity of the resin by removing the air film on the surface of the resin particles. This enables the bed to have a greater active life between periods of regeneration and provides a more efficient utilization of the regenerant.

The ion exchange resin which is used in the tank can be any of the conventional anionic or cationic ion exchange resins conventionally used in water softening systems or other similar ion exchange processes. Generally, the ion exchange resin is an alkyl divinyl sulfonate. Specific examples of resins which can be used are Rohm and Haas, IR-120, IRA-400 or IR-45; Dow Chemical Co., Dowex 50, Nalco Chemical Company, HCR, SBR or SAR; and the like.

Any conventional wetting agent or surfactant can be added to the ion exchange resin bed. The surfactant may take the form of an alkyl ayrl sulfonate with the alkyl group having from 2 to 18 carbon atoms, such as sodium lauryl phenol sulfonate or sodium dodecyl benzene sulfonate; alkynol amides with the alkynol group having from 2 to 18 carbon atoms, such as ethanol amide, methyl lauryl amide, coconut oil amide, isopropanol amide and the like; alkyl sulfates such as sodium lauryl sulfate; alkyl amides with the alkyl group containing from 2 to 18 carbon atoms, such as lauramide, and the like. In addition, cationic wetting agents such as dodecyl pyridinium chloride, trimethyl ammonium bromide pyridinium chloride, cetyl pyridinium chloride, quaternary ammonium compounds such as cetyl dimethyl benzyl ammonium chloride, and the like, can be used. In addition, non-ionic material such as polyethylene ethers of alkylated aromatic alcohols can be employed, such as octyl, nonyl or dodecyl phenyl ether of condensed ethylene oxide where the condensed ethoxy chain has 2 to 18 carbon atoms. In the above examples, other alkali metals such as potassium or lithium can be used in place of sodium.

The amount of wetting agent added to the resin bed is not critical, and any amount sufficient to wet the surface of the resin particles will be sufficient. The wetting agent is generally employed as a dilute aqueous solution with the wetting agent comprising less than 10% by weight of the solution, and preferably 2 to 5%. Generally, about 10 cc. of a 2 to 5% solution of the wetting agent is used per one-half cubic foot of ion exchange resin.

The wetting agent can be added to the resin bed at any time prior to the operation of the water softener. Generally, it is desirable for the manufacturer to add the wetting agent to the resin bed after the tank is pressure-tested and before the tank is shipped to the location of use. However, the wetting agent can also be introduced into the tank just prior to operation of the softener, if desired.

At the time of installing the water softener, the tank is filled with water and it is desirable to flow the water through the tank for a period of about 5 minutes to remove all traces of the wetting agent from the resin. During this period of flushing with the water, air which is entrapped within the interstices of the resin particles, as well as between the particles themselves, is released in the form of fine or small bubbles which rise upwardly and accumulate within the upper portion of the tank. The use of the wetting agent substantially removes all of the entrapped air from the resin particles.

During the regeneration cycle and backflushing phase, the pressure on the water softening tank is suddenly released and the air compressed in the upper portion of the tank can escape. However, as substantially all of the air entrapped within the resin has previously been released, there will be no explosive expansion of entrapped air within the resin bed to blow the resin out of the tank. Thus, during the backwash phase, the resin bed is substantially undisturbed which eliminates the problem of plugging of valves, control elements and the like by the blown out resin.

As a specific example of the invention, 0.5 cubic feet of Rohm and Haas cationic ion exchange resin IR-120 was placed in a 6-gallon tank of an automatic water softener. The tank was pressure tested with water at a pressure of approximately 40 p.s.i. and subsequently the water was blown out of the tank by air. After blowing out of the water, 10 cc. of a 5% solution of sodium dodecyl benzene sulfonate in water was added to the tank. The tank was then sealed in preparation for shipment to the location of use.

On installation of the tank, the tank was connected to the water conduit and water was flowed into the tank to fill the same. As the tank was filled with water, the air entrapped within the resin bed was released in the form of fine bubbles which rose to the surface of the water and accumulated within the upper portion of the tank. The water was flowed through the tank for a period of about 5 minutes to completely remove all of the wetting agent from the ion exchange bed.

The addition of the wetting agent to the ion exchange resin bed not only eliminates the problem of the resin flowing out of the tank during the regeneration cycle, but also substantially increases the ion exchange capacity of the resin by releasing the air film from the surface of the resin particles. It has been found that the capacity of the ion exchange resin can be increased in the order of 50% or more by the addition of the wetting agent to the ion exchange resin bed.

While the above description was directed to a water softening process, the invention can also be utilized in any system employing an ion exchange resin, such as the recovery of metals from pickle liquors, demineralizers, and other ion exchange processes where the removal of entrapped air in the resin bed is a problem.

Various modes of carrying out the invention are contemplated as being within the scope of the following claims particularly pointing out and distinctly claiming the subject matter which is regarded as the invention.

I claim:

1. A method of removing entrapped gas from an ion exchange resin bed, comprising the steps of introducing an organic wetting agent into contact with the ion exchange resin bed to wet the surface of the resin particles and release gas entrapped within the particles in the bed, and rinsing the ion exchange resin bed to remove the wetting agent with the entrapped gas being released during rinsing in the form of fine bubbles.

2. A method of removing entrapped air from an ion exchange resin bed, comprising the steps of forming an ion exchange resin bed in a tank, introducing a wetting agent containing approximately 2 to 5% in aqueous solution into the tank into contact with the ion exchange resin bed to wet the surface of the resin particles and free entrapped air, and thereafter flowing water through the tank for approximately five minutes to remove the wetting agent from the bed, said entrapped air being released in the form of fine bubbles.

3. A method of removing entrapped air from an ion exchange resin bed and substantially increasing the capacity of the bed, comprising the steps of providing an ion exchange resin bed, introducing an organic wetting agent in an approximately 2–5% aqueous solution into contact with the resin bed to wet the surface of the ion exchange resin particles and release the entrapped air in the resin bed, and rinsing the resin bed for approximately five minutes to remove the organic wetting agent from the resin bed and release and carry away the entrapped air in the form of fine bubbles.

4. The method of claim 3 in which the organic wetting agent is selected from the group consisting of alkyl aryl sulfonates with the alkyl group having from 2 to 18 carbon atoms, alkynol amides with the alkynol group having from 2 to 18 carbon atoms, alkyl sulfates, alkyl amides with the alkyl group having from 2 to 18 carbon atoms, alkyl pyridinium chlorides, quaternary ammonium halides, and polyethylene ethers of alkylated aromatic alcohols.

References Cited by the Examiner

UNITED STATES PATENTS

| | | | |
|---|---|---|---|
| 2,762,852 | 9/1956 | Litton | 210—32 |
| 2,769,787 | 11/1956 | Diamond | 210—32 |
| 2,858,901 | 11/1958 | Fort | 55—22 |
| 3,123,553 | 3/1964 | Abrams | 210—30 |

OTHER REFERENCES

Samuelson: Ion Exchangers in Analytical Chemistry, Wiley, N.Y., 1953.

Ion Exchange Resins, The British Drug Houses Ltd., 1959.

REUBEN FRIEDMAN, *Primary Examiner.*

C. HART, *Assistant Examiner.*